United States Patent
Raj (10) Patent No.: US 10,031,776 B2
(45) Date of Patent: Jul. 24, 2018

(54) WORKFLOW JOB DISTRIBUTION IN A DATA PROCESSING SYSTEM WITH AGENT TIME WINDOW CONSTRAINTS

(71) Applicant: CA, Inc., New York, NY (US)

(72) Inventor: Apurv Raj, Hyderabad (IN)

(73) Assignee: CA, INC., New York, NY (US)

( * ) Notice: Subject to any disclaimer, the term of this patent is extended or adjusted under 35 U.S.C. 154(b) by 136 days.

(21) Appl. No.: 15/356,884

(22) Filed: Nov. 21, 2016

(65) Prior Publication Data
US 2018/0143851 A1    May 24, 2018

(51) Int. Cl.
*G06F 9/48*    (2006.01)
*G06F 9/50*    (2006.01)

(52) U.S. Cl.
CPC .......... *G06F 9/4881* (2013.01); *G06F 9/5044* (2013.01)

(58) Field of Classification Search
None
See application file for complete search history.

(56) References Cited

U.S. PATENT DOCUMENTS

| | | | |
|---|---|---|---|
| 6,470,375 B1 | 10/2002 | Whitner et al. | |
| 8,126,134 B1 | 2/2012 | Fama | |
| 8,429,087 B2 * | 4/2013 | Lv | G06Q 10/04 705/1.1 |
| 8,479,206 B2 | 7/2013 | Guccione et al. | |
| 2006/0053421 A1 * | 3/2006 | Dickenson | G06F 9/5016 718/100 |
| 2014/0137104 A1 | 5/2014 | Nelson et al. | |
| 2015/0026693 A1 * | 1/2015 | Satoh | G06F 9/4881 718/103 |
| 2016/0173599 A1 * | 6/2016 | Chablani | H04L 67/1097 709/217 |

OTHER PUBLICATIONS

Lombardi et al, Optimal Multi-Agent Scheduling with Constraint Programming, Association for the Advancement of Artificial Intelligence, 2007, 6 pages.*
Kinnebrew et al, Coordination of planning and scheduling techniques for a distributed multi-level multi-agent system, Vanderbilt University, 2010, 8 pages.*

(Continued)

*Primary Examiner* — Diem Cao
(74) *Attorney, Agent, or Firm* — Sage Patent Group (57) ABSTRACT

A method of scheduling jobs includes receiving a plurality of jobs that require execution, identifying a plurality of agents that are configured to execute at least one of the plurality of jobs, identifying a plurality of time windows in which the plurality of agents are, available to execute the plurality of jobs, identifying a constraint rule on the execution of the plurality of jobs, and identifying a plurality of possible execution paths. Execution paths that do not comply with the constraint;rule are removed from the plurality of possible execution paths to provide a preferred set of execution paths. The method further includes calculating a metric for each of the preferred set of execution paths, selecting an execution path in response to the metric, and causing the plurality of jobs to be executed by at least one of the agents according to the selected execution path.

20 Claims, 9 Drawing Sheets

(56) References Cited

OTHER PUBLICATIONS

Buzing et al.,Coordinating autonomous Planning Agents with Temporal Constraints, Delft University of Technology, 2006, 8 pages.*
Gonzales et al. "A Study of the Interval Availability and its Impact on SLAs Risk", Advances in Computer Science, Engineering & Applications, Proceedings of the Second International Conference on Computer Science, Engineering and Applications (ICCSEA 2012), May 25-27, 2012, New Delhi, India, vol. 1, pp. 10 pages.

* cited by examiner

WORKFLOW JOB DISTRIBUTION IN A DATA PROCESSING SYSTEM WITH AGENT TIME WINDOW CONSTRAINTS

BACKGROUND

The present disclosure relates to data processing systems, and in particular, to the scheduling of jobs in data processing systems.

Data processing systems utilize scheduling engines to schedule execution of computer processes, or "jobs." Scheduling the execution of computer processes is often referred to as job management, which may involve scheduling a computer process to occur at one designated time, repeatedly at periodic times, or according to other time schedules, Numerous scheduling engines exist today, such as Unicenter CA-7, Unicenter CA-Scheduler, and Unicenter CA-Job track available from Computer Associates.

In a distributed computing environment that includes many different data processing devices, such as a multi-server cluster, job scheduling is an important task. Distributed computing, environment typically include software that allocates computing tasks across a group of computing devices, enabling large workloads to be processed in parallel.

Cloud computing/storage environments have become a popular choice for implementing data processing systems. In a cloud computing/storage environment, a cloud provider hosts hardware and related items and provides systems and computational power as a service to a customer, such as a business organization.

Cloud computing/storage environments may support virtual machines (VM), which are emulations of physical machines implemented in software, hardware, or combination of both software and hardware, in a cloud computing environment, jobs may be delegated to virtual machines, Virtual machine resources may be scheduled in a similar manner as physical machine resources. Thus, a distributed computing environment may include physical machines, virtual machines, or a collection of both physical and virtual machines.

An entity that assigns tasks, or jobs, is referred to herein as a "scheduling agent," or "scheduler." Entities to which tasks, or jobs, are assigned by a scheduler are generally referred to as "agents" or "workload agents," and may reside on physical machines and/or virtual machines.

SUMMARY

Some embodiments provide methods of scheduling jobs in a distributed computing environment. The methods may be performed on a suitably configured processor off computing device. A method according to some embodiments includes receiving a plurality of jobs that require execution, identifying a plurality of agents that are configured to execute at least one of the plurality of jobs, identifying a plurality of time windows in which the plurality of agents are available to execute the plurality of jobs, identifying a constraint rule on the execution of the plurality of jobs, and identifying a plurality of possible execution paths, wherein each of the execution paths includes a possible set of selected ones of the time windows in which respective ones of the plurality of agents in the execution path can execute at least one job of the plurality of jobs and wherein the respective ones of the plurality of agents in the execution path can collectively execute all of the plurality of jobs. Execution paths that do not comply with the constraint rule are removed from the plurality of possible execution paths to provide a preferred set of execution paths. The method further includes calculating a metric for each of the preferred set of execution paths, selecting an execution path in response to the metric, and causing the plurality of jobs to be executed by at least one of the agents according to the selected execution path.

The metric may include an execution time, and selecting an execution path in, response to the metric may include selecting an execution path that has a smallest execution time.

The metric may include an execution completion time, and selecting an execution path in response to the metric may include selecting an execution path that has an earliest execution completion time.

The constraint rule may include a number of concurrently executable jobs by the plurality of agents. In some embodiment, the constraint rule may include a start time of a time window, an end time of a time window and/or a network latency between at least two of the plurality of agents.

The metric may include an execution path time. The execution path time may be calculated as: ExecutionPathTime=$\Sigma$JobExecTime+$\Sigma$WaitingTime+$\Sigma$NetworkLatency, where $\Sigma$JobExecTime is the sum of execution times of all of the jobs, $\Sigma$WaitingTime is the sum of times between time windows in the execution path and. $\Sigma$NetworkLatency is the sum of network latencies between agents in the execution path.

The constraint may include a requirement that a start time of a current time window in the execution path is later than a sum of an end time of a previous time window in the execution path plus a network, latency between a current agent associated with the current time window and a previous agent associated with the previous time window.

Selecting the execution path that has the smallest execution time may include determining an execution time for each execution path in the preferred set of execution paths, determining an average execution time for each execution path in the preferred set of execution paths, and discarding execution paths for which the execution time is greater than the average execution time.

The method may further include determining agent capacities for each execution path in the preferred set of execution paths, determining an average agent capacity for each execution path in the preferred set of execution paths, and discarding execution paths for which the agent loading is greater than the average agent loading.

The method may further include generating a directed graph having vertices corresponding to the time windows and edges corresponding to transitions between the time windows, and generating the plurality of possible execution paths as traversals of the directed graph from a start point to an end point.

Generating the plurality of possible execution paths may include performing a depth first traversal of the directed graph from the start point.

Related computer program products are also disclosed.

Other methods, devices, and computers according to embodiments of the present disclosure will be or become apparent to one with skill in the art upon review of the following drawings and detailed description. It is intended that all such methods, mobile devices, and computers be included within this description, he within the scope of the present inventive subject matter, and be protected by the accompanying claims.

BRIEF DESCRIPTION OF THE DRAWING

Other features of embodiments will be more readily understood from the following detailed description of speaccompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As discussed above, in a distributed computing environment, a scheduler may assign various tasks to one or more agents.

Agents, whether they are implemented in physical or virtual machines, have a finite capacity for handling assigned workloads based on the amount of resources, such as processor capacity, memory, bandwidth, etc., available to the workload server. Moreover, the resources available to a virtual server may change dynamically, as the resources may be shared by other virtual machines hosted on the same physical server as the agent.

Conventionally, if a scheduler assigns a job to an agent and the agent does not have capacity to perform the job, either the job will be queued until the workload agent has capacity or the workload agent will return an error in response to the assignment. In either case, execution of the job is delayed, and the scheduler may incur additional overhead associated with the job.

Some embodiments described herein may be advantageously employed in distributed data processing environments in which a scheduler needs to schedule multiple jobs on multiple available workload agents that arc available only during specified time windows. Some embodiments identify potential execution paths, discard execution paths that do not meet one or more specified, constraint rules, and choose an execution path from among the remaining execution paths based on one or more metrics.

Figure 1:
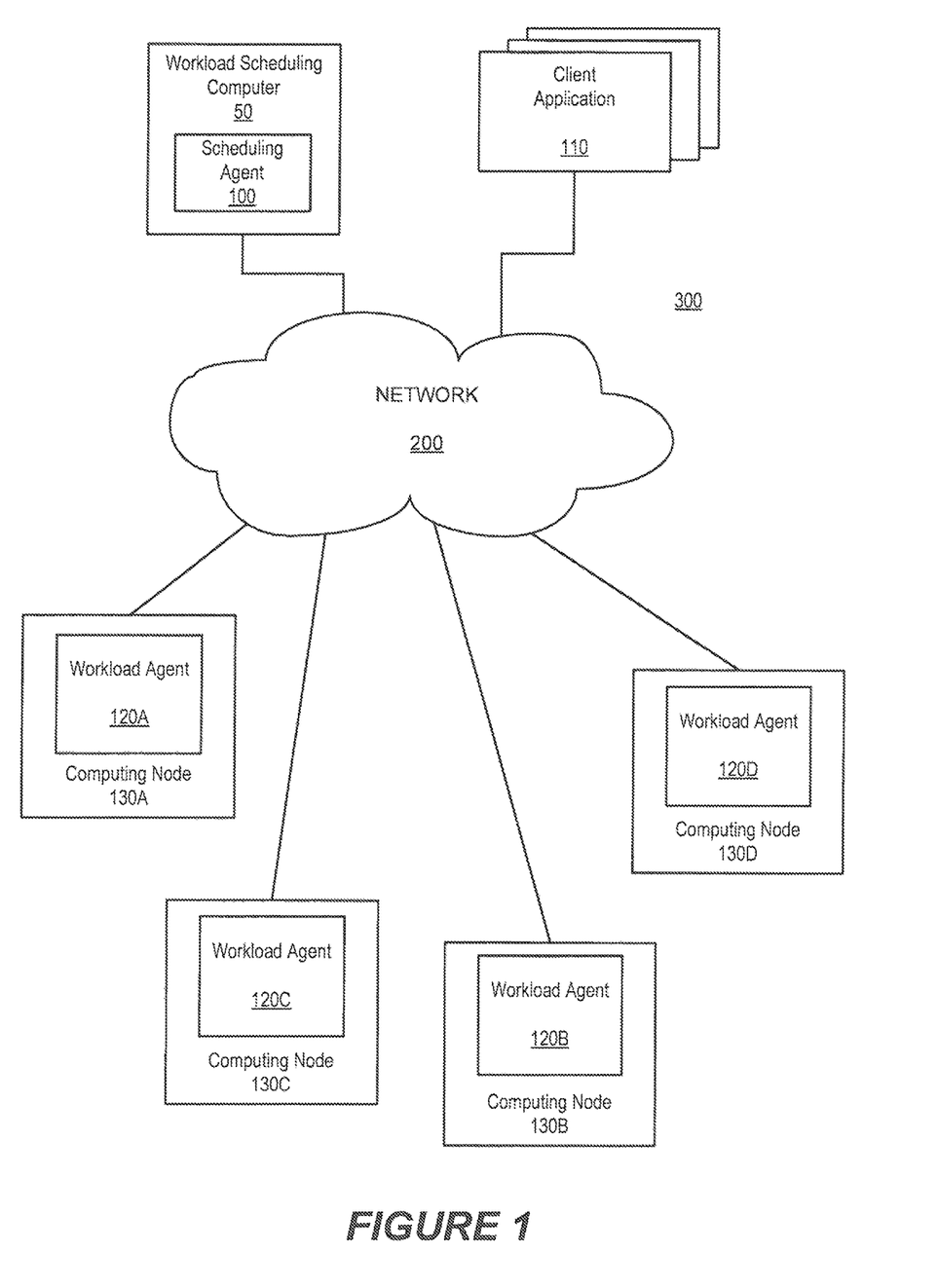
FIG. 1 is a block diagram illustrating a network environment in which embodiments according to the inventive concepts can be implemented.

FIG. 1 is a block diagram of a distributed data processing environment 300 in which systems/methods according to embodiments of the inventive concepts may be employed. Referring to FIG. 1, a plurality of, computing nodes 130A-130D are provided in the environment 300. The computing nodes 130A-130D may be generally referred to as computing nodes 130. The computing nodes 130 may be physical devices, such as servers that have processors and associated resources, such as memory, storage, communication interfaces, etc., or virtual machines that have virtual resources assigned by a virtual hypervisor. The computing nodes communicate over a communications network 200, which may be a private network, such as a local area network (LAN) or wide area network (WAN), or a public network, such as the Internet. The communications network may use a communications protocol, such TCP/IP, in which each network node is assigned a unique network address, or IP address.

One or more of the computing nodes 130 may host one or more workload agents 120, which are software applications configured to process jobs assigned by a scheduling agent 100. The scheduling agent 100 may be referred to herein as a "workload scheduler," or more simply a "scheduler." In the distributed computing environment illustrated in FIG. 1, jobs are requested by client, applications 110. A job request may be sent by a client application 110 to the scheduling agent 100. The scheduling agent 100 in turn distributes the job to one of the available workload agents 120 based on one or more parameters.

A workload agent 120, such as workload agent 120A, may receive a job assignment from the scheduling agent 100, perform the job, and return a result of the job to the scheduling agent 100, or alternatively to the client application 110 that requested the job. In other embodiments, the client application may submit the job to a job manager (not shown), that may split the job into a plurality of sub-tasks, and request the scheduling agent 100 to assign each of the individual sub-tasks to one or more agents for completion. In some embodiments, the scheduling agent 100 may divide a job into individual sub-tasks for scheduling.

Figure 2:
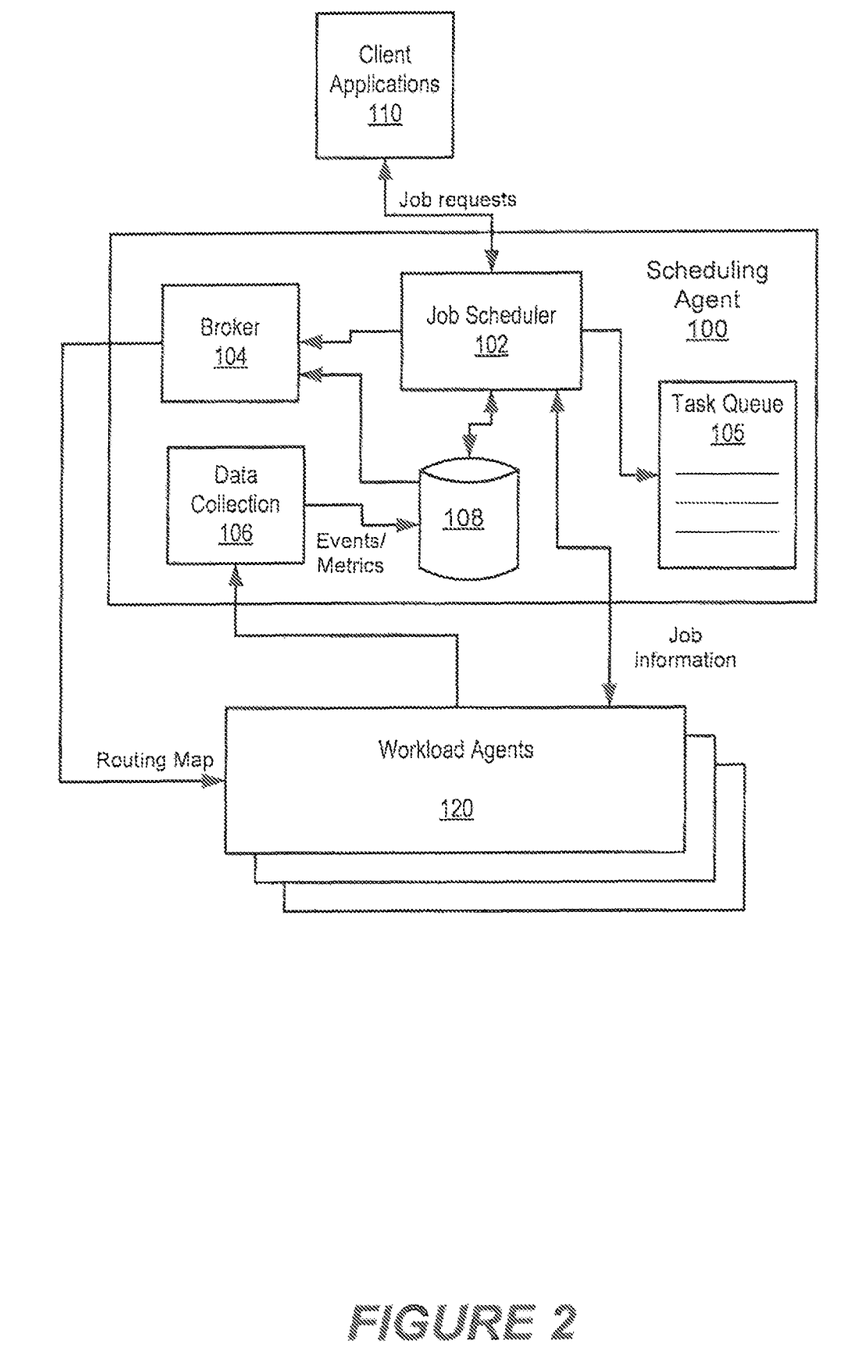
FIG. 2 is a block diagram of a workload scheduling computer according to some embodiments of the inventive concepts.

FIG. 2 is a block diagram of a scheduling agent 100 according to some embodiments showing components of the scheduling agent 100 in more detail. The scheduling agent 100 includes' various modules that communicate with one another to perform the workload scheduling function. For, example, the scheduling agent 100 includes a job scheduler module 102, a task queue 105, a database 108, a broker module 104, and a data collection module 106. It will be appreciated that the scheduling agent 100 may be implemented on a single physical or virtual machine, or its functionality may be distributed over multiple physical or virtual machines. Moreover, the database 108 may be located in the scheduling agent 100 or may be accessible to the scheduling agent 100 over a communication interface.

Client applications 110 submit job requests to the scheduling agent 100. The job requests are forwarded to the job scheduler module 102 for processing. The job scheduler module 102 uses the task queue to keep track of the assignment and status of jobs. The job scheduler transmits job information to workload agents 120 for processing, and may also store information about jobs in the database 108.

Information about the status of workload agents, such as the available workload capacity of workload agents, is collected by the broker module 106 and stored in the database 108, which is accessible to both the job scheduler 102 and the broker module 104. The data collection module 106 may collect information about, events relating to jobs and metrics provided by agents and stores such information in the database 108. The job-related events may include job status information (queued, pending, processing, completed, etc.) and/or information about the agents, such as whether an agent is available for scheduling, is being taken offline, etc.

According to some embodiments, the broker module 104 provides routing map information directly to the workload agents 120. The routing map information may be provided along with job information or independent from job information to allow a workload agent to forward jobs to other workload agents as needed.

One problem that a scheduling agent may face when scheduling jobs at workload agents is that some agents may only be available for processing certain types of jobs during fixed time windows. In addition, some jobs include sub-tasks that must be processed by certain types of agents. For example, some jobs require one type of agent to perform a first sub-task, after which the job is forwarded to another type of agent for performing a second sub-task. When particular types of agents are only available during certain time periods, the scheduler may have a difficult task to schedule execution of the job within a desired time frame.

For example, consider a scenario in which, a job includes three sub-tasks that require execution by three different types of agents (e.g., a Windows agent, a SAP agent and a Unix agent). In deciding how to schedule the execution of the three sub-tasks, the scheduler is faced with the problem of determining a scheduling strategy that enables the overall job to be completed within a desired constraint, such as within a particular length of time or within a shortest time.

Similarly, a scheduler mat be faced with determining how to schedule execution of a job by different agents that have different windows of availability and that have different workloads and/or capacities. The scheduler is once again faced with the task of determining how to schedule a job including one or more tasks in such a way that the job is completed within a shortest time, by a certain time, and/or subject to some other constraint.

Embodiments of the inventive concepts may be particularly suitable for scheduling jobs that have non-deterministic scheduling constraints (i.e., jobs that do not have a deterministic constraint, such as a predetermined start time). For example, some embodiments of the inventive concepts may be particularly suitable for scheduling jobs that have constraints, such as minimum execution times or execution deadlines.

Figure 3:
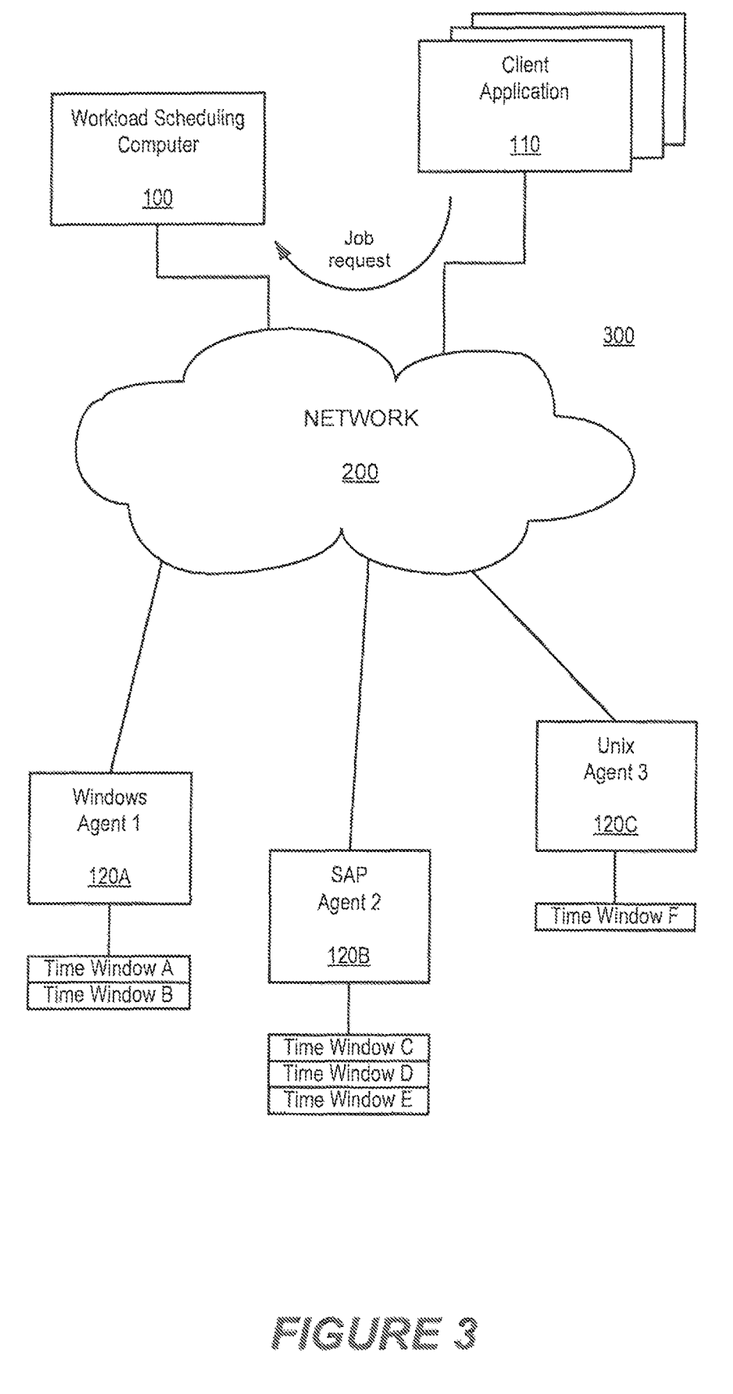
FIG. 3 is a block diagram illustrating a network environment in which agents can be deployed according to embodiments of the inventive concepts.

FIG. 3 illustrates a distributed computing environment 300 including a plurality of workload agents 120A to 120C that have different configurations. For example, workload agent 120A (Agent 1) may be a Windows agent that is, configured to execute jobs using a Microsoft Windows-based operating system. Likewise, workload agent 120B (Agent 2) may be a SAP agent, and workload agent 120C (Agent 3) may be a Unix agent. At the request of one or more clients 110, the scheduling agent 100 schedules jobs to be performed by the workload agents 120A-120C by communicating with the workload agents 120A-120C through the communications network 200. Each of the workload agents 120A-120C may have one, or more windows of availability during which it is available for executing jobs that are scheduled by the scheduling agent 100. For example, the Windows workload agent 120A may only be available during time windows A and B, the SAP workload agent 120B may only be available during time windows C, D, and E, and the Unix workload agent 120C may only be available during time window F. The time windows during which the various workload agents 120A-120C are available may be communicated to the scheduling agent 100 from time to time or at specific times, in response to a request from the scheduling agent 100, or otherwise.

Assume for purposes of example that the scheduling agent 100 needs to schedule six jobs, subject to the constraint rules that (i) the execution path duration should be less than a threshold value and (ii) the number of agent time windows to be used is at least two but less than four. Assume further that each of the agents is capable of processing no more than two jobs during a given time window. Assume further that the agent time windows are as shown in the Table 1, below. The lengths, of the time windows in Table 1 are arbitrary and are given for purposes of illustration only.

TABLE 1

| Time Windows | |
| --- | --- |
| Time Window | Duration |
| A | 7:00 AM-8:00 AM |
| B | 9:00 AM-9:30 AM |
| C | 6:00 AM-7:00 AM |
| D | 9:00 AM-9:20 AM |
| E | 3:00 PM-4:00 PM |
| F | 10:00 AM-10:20 AM |

Given these constraints, there is a limited number of execution paths that the scheduling agent could choose to execute the jobs. For example, one way to execute the job set may be denoted as {(1,A), (2,D), (3,F)}. That is, Agent 1 may execute two jobs in time window A, Agent 2 may execute two jobs in time window D, and Agent 3 may execute two jobs in time window F. In this case, the total execution time is 200 minutes (7:00 AM to 10:20 AM). Other execution paths are possible. For example, another possible execution path is {(2,C), (2,D)}. Parallel execution paths may be denoted by multiple time windows. For example, one possible execution path with parallel branches is {(1,A)(2,C), (1,B)(2,D), (2, E)(3,F)}. It will be appreciated that {(1,B), (2,D), (3,F)} is not a valid execution path, because time windows B and D overlap. Moreover, {(2,C), (1,A),(3,F)} may not be a valid execution path if network latencies are taken into account, since time window C ends at 7:00 AM and time window A begins at 7:00 AM.

Some embodiments provide methods of scheduling a plurality of jobs by a plurality of agents. The methods, which may be performed by a scheduler, first identify a constraint rule on the execution of the plurality of jobs, and identify a plurality of possible execution paths for the jobs. Each of the possible execution paths may be defined by a possible set of time windows in which respective ones of a plurality of available agents can execute at, least one of the jobs. The agents in the execution path can collectively execute all of the jobs. That is, a plurality of possible execution paths are identified, each of which, if followed, would result in the completion of all of the jobs that are being scheduled.

Execution paths that do not comply with the constrain rule are removed from the plurality of possible execution paths. The execution paths that remain comprise a preferred set of execution paths. A metric is then calculated for each of the preferred set of execution paths, and an execution path is selected from the preferred set of execution paths in response to the metric. The plurality of jobs may then be scheduled by the scheduler to be executed in accordance with the selected execution path.

In order to analyze this problem in a straightforward manner that is easy to visualize, some embodiments generate a directed graph having vertices corresponding to the time windows and edges corresponding to transitions between the time windows. Possible execution paths may then be generated, as traversals of the directed graph from a start point to an end point.

Figure 4A:
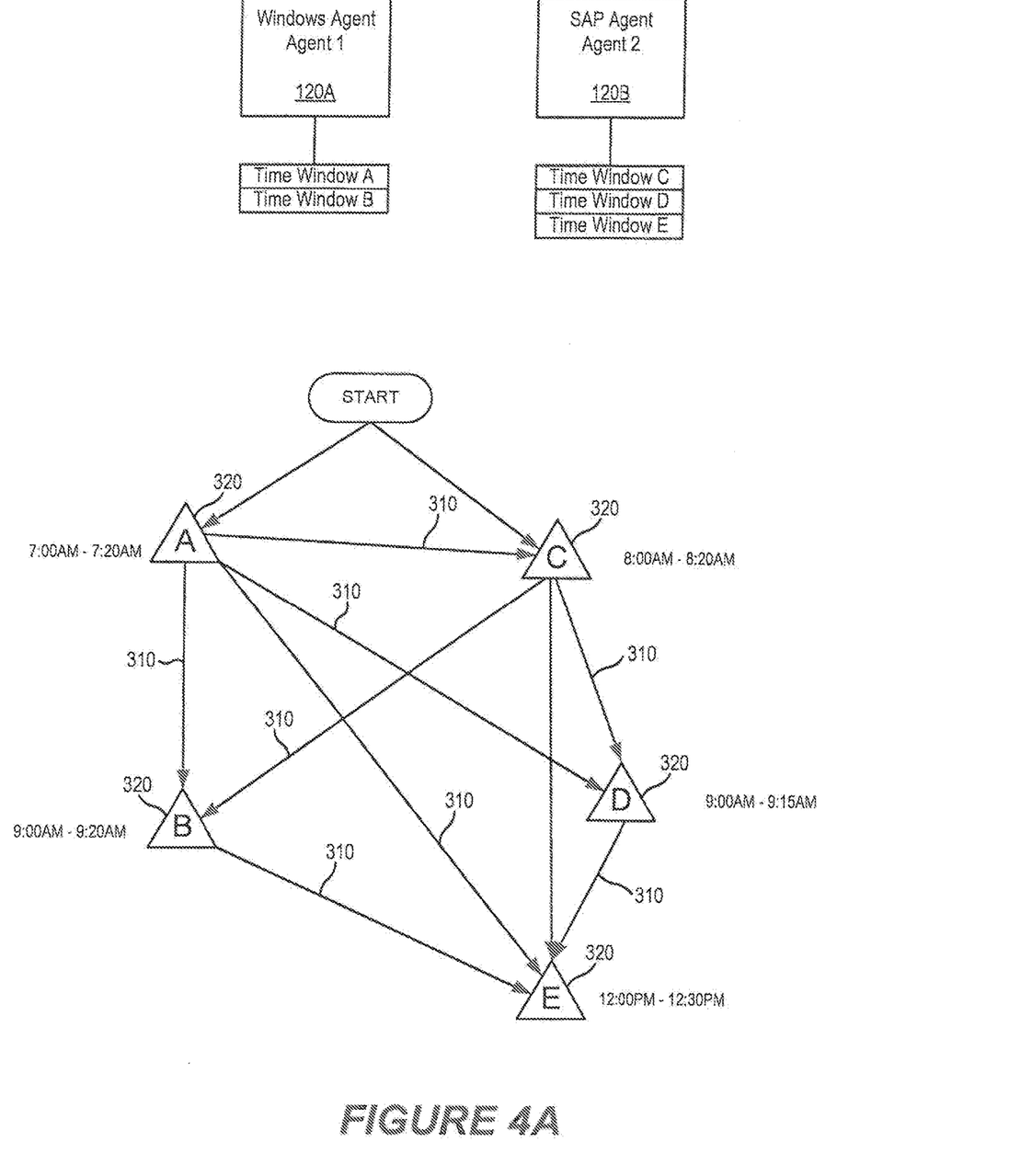
FIGS. 4A and 4B illustrate job scheduling according to some embodiments of the inventive concepts.

For example, Referring to FIG. 4A, a first workload agent 120A, referred to as Agent 1, and a second agent, referred to as Agent 2, are shown. Examples of time windows A through E are also illustrated as possible execution windows. For example, the time windows for the example illustrated in FIG. 4A may be as shown in Table 2, below. The Tenths of the time windows in Table 2 are arbitrary and are given for purposes of illustration only.

TABLE 2

| Time Windows | |
|---|---|
| Time Window | Duration |
| A | 7:00 AM-7:20 AM |
| B | 9:00 AM-9:20 AM |
| C | 8:00 AM-8:20 AM |
| D | 9:00 AM-9:15 AM |
| E | 12:00 PM-12:30 PM |

To select an execution path by which the jobs can be scheduled, systems/methods according to some embodiments may generate a directed graph having vertices corresponding to the time windows and edges corresponding to transitions between the time windows. Such a graph is illustrated, for example in FIGS. 4A and 4B, in which the time windows A to are shown as vertices, and transitions between the vertices are shown as lines, or edges, of the graph. The systems/methods may then generate a plurality of possible execution paths as traversals of the directed graph from a start point to an end point.

Assume for purposes of illustration that the scheduling agent 110 desires to schedule three jobs for execution by the agents. Assume farther that either agent can execute any of the three jobs. FIG. 4A illustrates a plurality of possible transitions 302 front execution during one time window to execution during another time window. For example, after processing at time window A is complete, processing can continue next in any of the remaining time windows, since time window A closes before any other time window opens. However, after processing at time window B is complete, processing can continue next only in time window E, since time windows C and D begin before time window B is complete.

The problem of selecting an execution path may be approached by performing a depth first traversal of the graph. That is, a depth-first traversal of the graph may be used to traverse the state space and create the search trees. Each of the vertices of the graph may be stored in an array and sorted in increasing order of waiting time from the root node S. Depth-first traversal (DFT) may be, performed on the graph in order from the vertices in the sorted array. If, at any given time, the tree generated from the DFT does not fulfill a constraint rule, the tree is discarded.

Various metrics, such as execution path times, agent capacities, waiting times, etc., can be calculated for the remaining trees. In some embodiments, trees having metrics greater than the averages of such metrics for all trees may be discarded until a tree having a minimum metric, such as a minimum execution path time, is found.

Figure 4B:
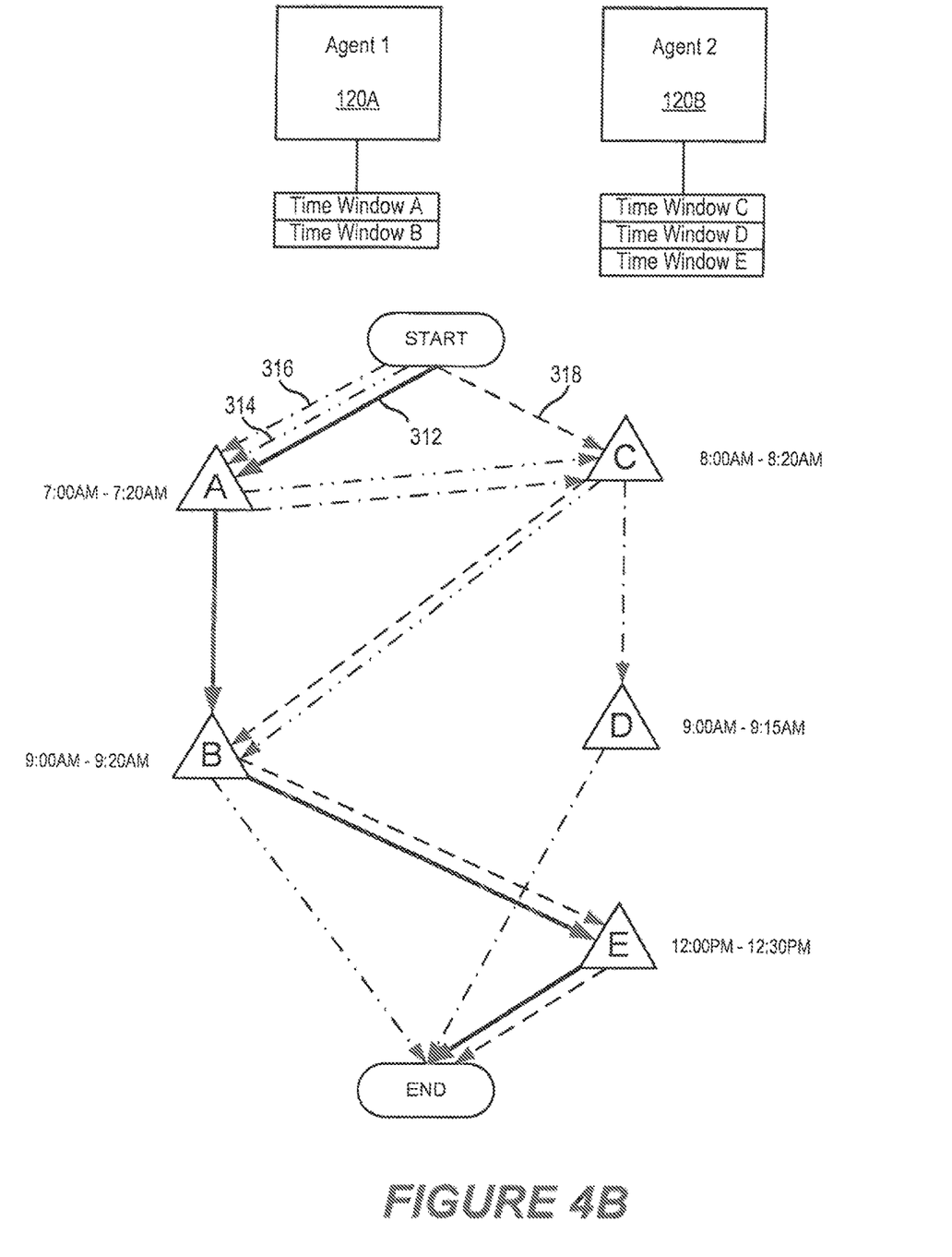

FIG. 4B illustrates an example of the generation and selection of execution paths based on a directed graph according to some embodiments. In the example shown in FIG. 4B, it is assumed that a scheduling agent needs to schedule three jobs, and that each workload agent can handle a maximum of one job in each time window. In particular, FIG. 4B illustrates four possible execution paths 312, 314, 316 and 318 that may be followed to accomplish the execution of three different jobs by the workload agents 120A, 120B. For example, in execution path 312, a first job (or sub-task) is executed at workload agent 120A during time window A, a second job or sub-task is executed at workload agent 120A during time window B, and a third job or sub-task is executed at workload agent 120B during, time window E. Execution path 312 is a possible execution path, because the path includes three execution time windows during which the three jobs can be executed, and the transitions from time window A time window B and from time window B to time window E are all allowable transitions. FIG. 4B also illustrates that execution paths 314 (A-C-B), 316 (A-C-D) and 318 (C-B-E) are also all possible execution paths.

The scheduler may then apply a constraint rule to further limit the available execution paths. One example of a constraint rule is a total execution time. Another example of a constraint rule is an execution deadline, or a time by which execution of the jobs must be complete. Yet another constraint rule may be a limit on a total number of concurrent jobs that may be executed by a given agent.

In still other embodiments, the constraint may include a requirement that a start time of a current time window in the execution path is later than a sum of an end time of a previous time window in the execution path plus a network latency between a current agent associated with the current time window and a previous agent associated with the previous time window. For example, a condition that may be imposed is:

$$_{STW}A_{N+1} \geq {}_{FTW}A_N + NL(A_N, A_{N+1}), N \in (1 \ldots K-1) \quad [2]$$

where K is the number of distinct time windows in a given path, $_{STW}A_{N+1}$ is the start time of the N+1th agent, time window, $_{FTW}A_N$ is the finish time of the Nth time window, and $NL(A_N, A_{N+1})$ is the network latency between the Nth and the N+1th agent. This constraint ensures that time windows in an execution path will not overlap, taking into account latency between the agents Other constraint rules are possible within the scope of the inventive concepts Once the possible execution paths have been identified, the scheduler 100 may remove all possible execution paths that do not comply the constraint rule. For example, assume that one constraint rule is that the jobs or sub-tasks must be completed before 10:00 AM. In that case, the execution paths 312 and 318 may be removed from consideration. Thus, the preferred set of execution paths that comply with the constraint rule may be limited to execution paths 314 and 316, since both of those tasks must be completed by no later than 9:20. Finally, a metric may be evaluated, and either execution path 314 or 316 may be chosen based on the evaluation of the metric.

For example, the metric may include an execution path time. The execution path time may be calculated as according to the following formula:

$$ExecutionPathTime = \Sigma JobExecTime + \Sigma WaitingTime + \Sigma NetworkLatency \quad [1]$$

where ΣJobExecTime is the sum of execution times of all of the jobs, ΣWaitingTime is the sum of times between time windows in the execution path and ΣNetworkLatency is the sum of network latencies between agents in the execution path.

The execution path with the shortest execution path time may be selected, and the scheduler 100 may schedule the jobs according to the selected execution path.

Figure 5:
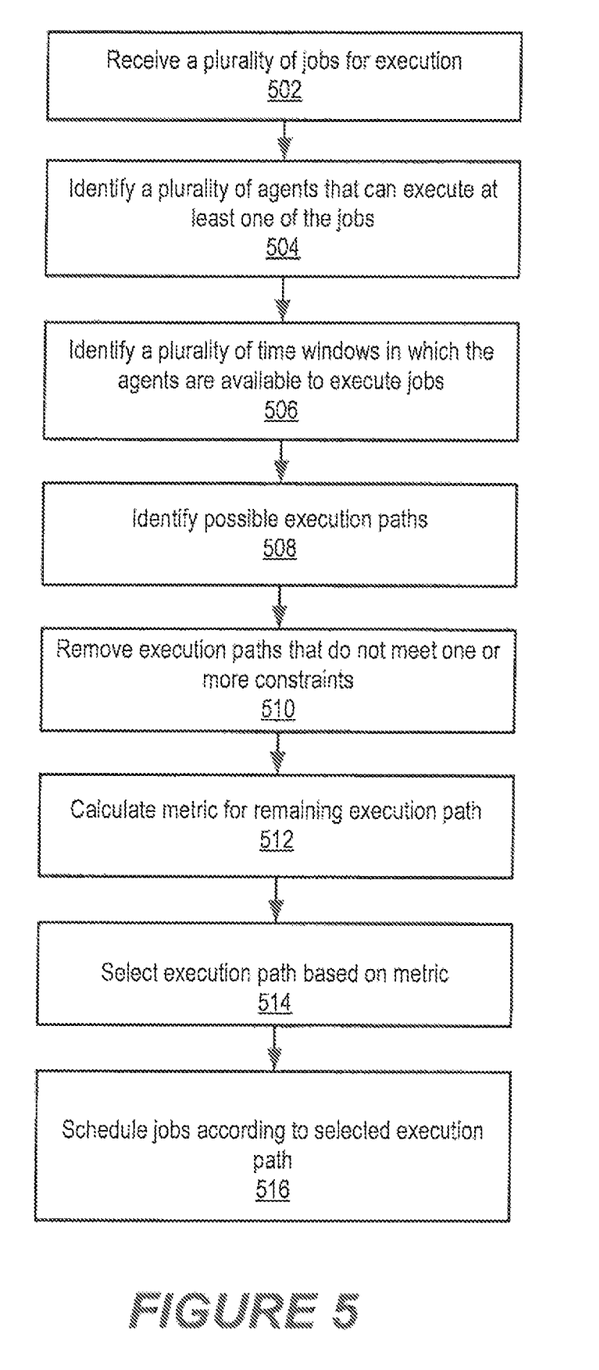
FIGS. 5-7 are flowcharts illustrating operations of systems/methods in accordance with some embodiments of the inventive concepts.

FIG. 5 is a flowchart illustrating operations of systems/methods that may be performed by a scheduling agent 100 according to some embodiments. Operations commence when the scheduling agent 100 receives a plurality jobs for execution (Block 502). The scheduling agent 100 identifies a plurality of workload agents, or agents, 120 that can each execute at least one of the jobs (Block 504). The scheduling agent 100 then identifies a plurality of time windows in which the workload agents 120 are available to execute jobs assigned by the scheduling agent 100 (Block 506). The time windows may be communicated from the workload agents 120 to the scheduling agent 100 in response to a query from the scheduling agent 100, at regular intervals, when the scheduling agent 100 or the workload agent 120 is deployed, or at any other suitable time.

Once the scheduling agent 100 has determined the time windows in which the workload <agents 120 are available to execute jobs, the scheduling agent 100 identifies a plurality of possible execution paths (Block 508). As noted above, an "execution path" is possible set of time windows in which respective ones of a plurality of available agents can execute at least, one of the jobs, such that, if the execution path is followed, all of the jobs that are being scheduled will be completed.

Once all of the possible execution paths have been identified, the scheduling agent 100 removes or, discards execution, paths that do not meet one or more identified, constraint rules (Block 510). The constraint rule may include, for example, a number of concurrently executable jobs by the plurality of agents. In some embodiments, the constraint rule may include a start time of a time window, an end time of a time window and/or a network latency between at least two of the plurality of agents. In some embodiments, the constraint rule may include a minimum execution time or an execution completion deadline.

In still further embodiments, the constraint may include a requirement that a start time of a current time window in the execution path is later than a sum of an end time of a previous time window in the execution path plus a network latency between a current agent associated with the current time window and a previous agent associated with the previous time window.

Once the execution paths that do not satisfy the applicable constraint rule(s) have been removed, the remaining set of execution paths is a preferred set of execution paths. An execution path is selected from among the preferred set of execution paths based on the evaluation of a metric. Accordingly, the scheduling agent 100 calculates the metric (Block 512) and, selects an execution path, based on the metric (Block 514). Finally, the scheduling agent 100 schedules the jobs for execution according to the selected execution path (Block 516).

The metric may include an execution path time. The execution path time may be calculated according to equation [1], above.

Figure 6:
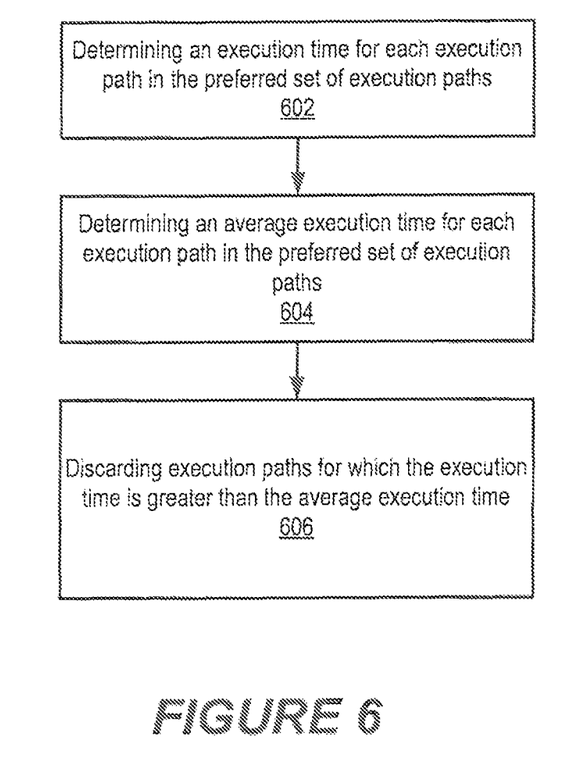

FIG. 6 illustrates operations of a scheduling agent 100 according to further aspects of the inventive concepts. Referring to FIG. 6, in some embodiments, the execution path that has the smallest execution time may be selected by determining an execution time for each execution path in the preferred set of execution paths (Block 602), determining an average execution time for each execution path in the preferred set of execution paths (Block 604), and discarding execution paths for which the execution time is greater than the average execution time (Block 606).

Figure 7:
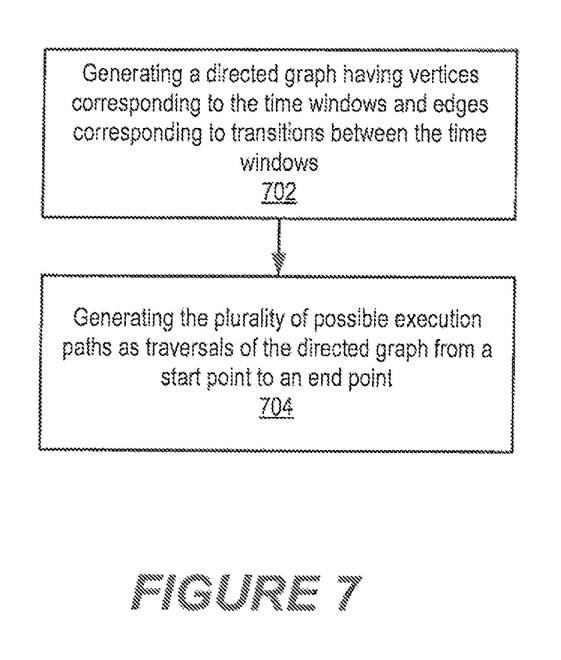

FIG. 7 illustrates operations of a scheduling agent 100 according to further aspects of the inventive concepts. As illustrated in FIG. 7, the methods may include generating a directed graph having vertices corresponding to the time windows and edges corresponding to transitions between the time windows (Block 702), and generating the plurality of possible execution paths as traversals of the directed graph from a start point to an end point (Block 704).

Figure 8:
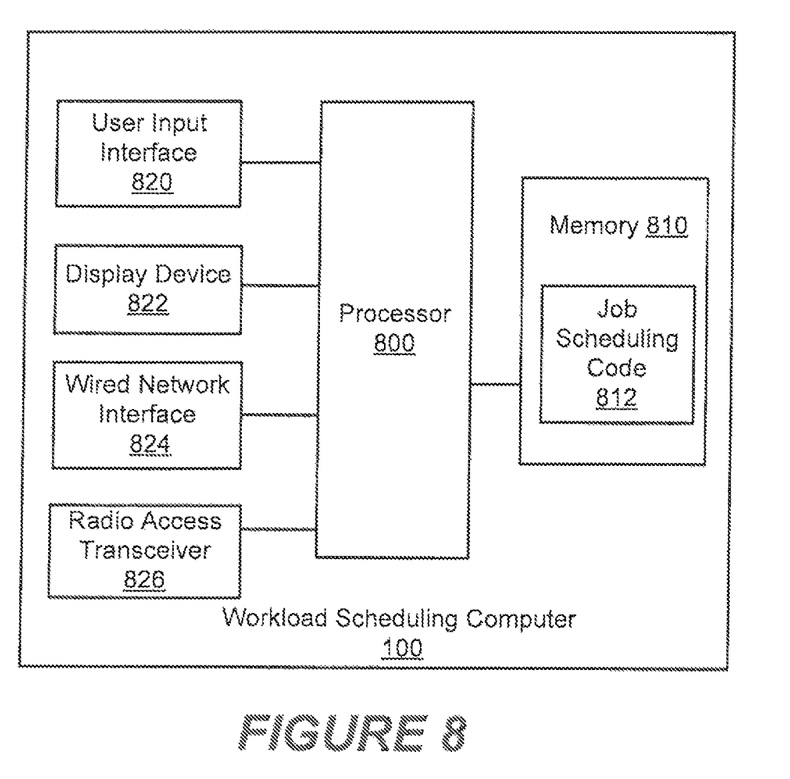
FIG. 8 is a block diagram of a computing system which can be configured as a workload scheduling computer according to some embodiments of the inventive concepts.

FIG. 8 is a block diagram of a device that can be configured to operate as a workload scheduling computer 50 on which a scheduling agent 100 according to some embodiments of the inventive concepts is deployed. The workload scheduling computer 50 includes a processor 800, a memory 810, and a network interface which may include a radio access transceiver 826 and/or a wired network interface 824 (e.g., Ethernet interface). The radio access transceiver 826 can include, but is not limited to, a LTE or other cellular transceiver, WLAN transceiver (IEEE 802.11), WiMax transceiver, or other radio communication transceiver via a radio access network.

The processor 800 may include one or more data processing circuits, such as a general purpose and/or special purpose processor (e.g., microprocessor and/or digital signal processor) that may be collocated or distributed across one or more networks. The processor 800 is configured to execute computer program code in the memory 810, described below as a non-transitory computer readable medium, to perform at least some of the operations described herein. The computer 800 may further include a user input interface 820 (e.g., touch screen, keyboard, keypad, etc.) and a display device 822.

The memory 810 includes computer readable code that configures the workload scheduling computer 50 to implement the scheduling agent 100. In particular, the memory 810 includes job scheduling code 812 that implements the functionality of the scheduling agent 100 to schedule the execution of jobs according to the methods described above, including performing functions of the job scheduler component 102, the broker component 104, and the data collection component 106 shown in FIG. 2.

Further Definitions and Embodiments

In the above-description of various embodiments of the present disclosure, aspects of the present disclosure may he illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form, of a computer program product comprising one or more computer readable media having computer readable program code embodied thereon.

Any combination of one or more computer readable media may be used. The computer readable media may be a non-transitory computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may he provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure, belongs. It will be .further understood that terms, such as those defined in commonly used dictionaries, should be interpreted as having meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical lunch on(s). It should also be noted that, in some alternative implementations, the functions noted in the block may occur out of the order noted in the figures. For example, two blocks shown in succession may, in fact, be executed substantially concurrently, or the blocks may sometimes he executed in the reverse order, depending upon the functionality involved, it will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence Or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
performing operations as follows on a processor of a computing device:
receiving a plurality of jobs that require execution;
identifying a plurality of agents that are configured to execute at least one of the plurality of jobs;
identifying a plurality of time windows in which the plurality of agents are available to execute the plurality of jobs;
identifying a constraint rule on the execution of the plurality of jobs;
identifying a plurality of possible execution paths, wherein each of the execution paths comprises a possible set of selected ones of the time windows in which respective ones of the plurality of agents in the execution path can execute at least one job of the plurality of jobs and wherein the respective ones of the plurality of agents in the execution path can collectively execute all of the plurality of jobs;
removing execution paths from the plurality of possible execution paths that do not comply with the constraint rule to provide a preferred set of execution paths;
calculating a metric for each of the preferred set of execution paths;
selecting an execution path in response to the metric; and
causing the plurality of jobs to be executed by at least one of the agents according to the selected execution path.

2. The method of claim 1, wherein the metric comprises an execution time, and wherein selecting an execution path in response to the metric comprises selecting an execution path that has a smallest execution time.

3. The method of claim 2, wherein selecting the execution path that has the smallest execution time comprises:
determining an execution time for each execution path in the preferred set of execution paths;
determining an average execution time for each execution path in the preferred set of execution paths; and
discarding execution paths for which the execution time is greater than the average execution time.

4. The method of claim 3, further comprising:
determining agent capacities for each execution path in the preferred set of execution paths;
determining an average agent capacity for each execution path in the preferred set of execution paths; and
discarding execution paths for which the agent loading is greater than the average agent loading.

5. The method of claim 1, wherein the metric comprises an execution completion time, and wherein selecting an execution path in response to the metric comprises selecting an execution path that has an earliest execution completion time.

6. The method of claim 1, wherein the constraint rule comprises a number of concurrently executable jobs by the plurality of agents.

7. The method of claim 1, wherein the constraint rule comprises a start time of a time window, an end time of a time window and/or a network latency between at least two of the plurality of agents.

8. The method of claim 1, wherein the metric comprises an execution path time, wherein the execution path time is calculated as:

$$ExecutionPathTime = \Sigma JobExecTime + \Sigma WaitingTime + \Sigma NetworkLatency$$

where $\Sigma JobExecTime$ is the sum of execution times of all of the jobs, $\Sigma WaitingTime$ is the sum of times between time windows in the execution path and $\Sigma NetworkLateney$ is the sum of network latencies between agents in the execution path.

9. The method of claim 1, wherein the constraint comprises a requirement that a start time of a current time window in the execution path is later than a sum of an end time of a previous time window in the execution path plus a network latency between a current agent associated with the current time window and a previous agent associated with the previous time window.

10. The method of claim 1, further comprising:
generating a directed graph having vertices corresponding to the time windows and edges corresponding to transitions between the time windows; and
generating the plurality of possible execution paths as traversals of the directed graph from a start point to an end point.

11. The method of claim 10, wherein generating the plurality of possible execution paths comprises performing a depth first traversal of the directed graph from the start point.

12. A computer program product, comprising:
a non.-transitory computer readable storage medium comprising computer readable program code embodied in the medium that when executed by a processor of a computing device causes the processor to perform operations comprising:
receiving a plurality of jobs that require execution;
identifying a plurality of agents that are configured to execute at least one of the plurality of jobs;
identifying a plurality of time windows in which the plurality of agents are available to execute the plurality of jobs;
identifying a constraint rule on the execution of the plurality of jobs;
identifying a plurality of possible execution paths, wherein each of the execution paths comprises a possible set of selected ones of the time windows in which respective ones of the plurality of agents can execute at least one job of the plurality of jobs and wherein the respective ones of the plurality of agents can collectively execute all of the plurality of jobs;
removing execution paths from the plurality of possible execution paths that do not comply with the constraint rule to provide a preferred set of execution paths;
calculating a metric for each of the preferred set of execution paths;
selecting art execution path in response to the metric; and
causing the plurality of jobs to be executed by at least one of the agents according to the selected execution path.

13. The computer program product of claim 12, wherein the metric comprises an execution time, and wherein selecting an execution path in response to the metric comprises selecting an execution path that has a smallest execution time.

14. The computer program product of claim 13, wherein selecting the execution path that has the smallest execution time comprises:

determining an execution time for each execution path in the preferred set of execution paths;

determining an average execution time for each execution path in the preferred set of execution paths; and discarding execution paths for which the execution time is greater than the average execution time.

15. The computer program product of claim 14, wherein the program code, further causes the processor to perform operations comprising:

determining agent capacities for each execution path in the preferred set of execution paths;

determining an average agent capacity for each execution path in the preferred set of execution paths; and discarding execution paths for which the agent loading is greater than the average agent loading.

16. The computer program product of claim 12, wherein the metric comprises an execution completion time, and wherein selecting an execution path in response to the metric comprises selecting an execution path that has an earliest execution completion time.

17. The computer program product of claim 12, wherein the constraint rule comprises a number of concurrently executable jobs by the plurality of agents.

18. The computer program product of claim 12, wherein the constraint rule comprises a start time of a time window, an end time of a time window and/or a network latency between at least two of the plurality of agents.

19. The computer program product of claim 12, wherein the metric comprises an execution path time, wherein the execution path time is calculated as:

$$ExecutionPathTime = \Sigma JobExecTime + \Sigma WaitingTime + \Sigma NetworkLatency$$

where $\Sigma JobExecTime$ is the sum of execution times of all of the jobs, $\Sigma WaitingTime$ is the sum of times between time windows in the execution path and $\Sigma NetworkLatency$ is the sum of network latencies between agents in the execution path.

20. The computer program product of claim 12, wherein the constraint comprises a requirement that a start time of a current time window in the execution path is later than a sum of an end time of a previous time window in the execution path plus a network latency between a current agent associated with the current time window and a previous agent associated with the previous time window.

* * * * *